(12) United States Patent
Le Hetet et al.

(10) Patent No.: US 8,460,596 B2
(45) Date of Patent: Jun. 11, 2013

(54) METHOD OF MAKING A CORE COMPRISING AN ENVELOPE CONTAINING GRANULAR AND/OR POWDERY PRODUCTS, DEVICE AND CORE OBTAINED

(75) Inventors: Thomas Le Hetet, La Chevroliere (FR); Florian Musseau, Orvault (FR); Frédérick Cavaliere, Montigny le Bretonneux (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 13/000,210

(22) PCT Filed: Jun. 17, 2009

(86) PCT No.: PCT/FR2009/051152
§ 371 (c)(1),
(2), (4) Date: May 20, 2011

(87) PCT Pub. No.: WO2009/153523
PCT Pub. Date: Dec. 23, 2009

(65) Prior Publication Data
US 2011/0226660 A1 Sep. 22, 2011

(30) Foreign Application Priority Data
Jun. 20, 2008 (FR) ...................................... 08 54099

(51) Int. Cl.
*B06B 1/02* (2006.01)
*B28B 1/08* (2006.01)
*B65B 1/20* (2006.01)
*A01J 21/00* (2006.01)

(52) U.S. Cl.
USPC ............... 264/446; 246/69; 246/71; 246/405; 246/442; 246/443; 141/10; 141/11; 141/12; 141/69; 141/71; 141/73; 141/74; 141/78; 141/80; 425/425; 425/432; 425/456

(58) Field of Classification Search
USPC ................ 264/69, 71, 405, 443, 442; 141/10, 141/11, 12, 69, 71, 73, 74, 78, 80; 425/425, 425/432, 456
See application file for complete search history.

(56) References Cited

U.S. PATENT DOCUMENTS 3,132,404 A * 5/1964 Silberkuhl et al. ............. 425/218
3,300,849 A * 1/1967 Wiseman ........................ 29/424

(Continued)

FOREIGN PATENT DOCUMENTS

| DE | 102005056420 A1 | 5/2007 |
| FR | 2576546 A1 | 8/1986 |

(Continued)

OTHER PUBLICATIONS

International Search Report, dated Jan. 8, 2010, from corresponding PCT application.

*Primary Examiner* — Christina Johnson
*Assistant Examiner* — Atul P. Khare
(74) *Attorney, Agent, or Firm* — Young & Thompson

(57) ABSTRACT

A process for the production of a core that can be used for the manufacturing of a part that is made of composite material, whereby the core consists of at least one powdered and/or granular product (16), includes introducing the at least one powdered and/or granular product (16) by vibrating it in an outer envelope (14) placed in a device (18) having a cavity that is delimited by a wall (20) whose geometry is adapted to that of the core to be produced and flattening the outer envelope (14) against the wall (20), characterized in that vibrations are emitted slightly above the fill level during filling.

18 Claims, 1 Drawing Sheet

U.S. PATENT DOCUMENTS

Figure 1:
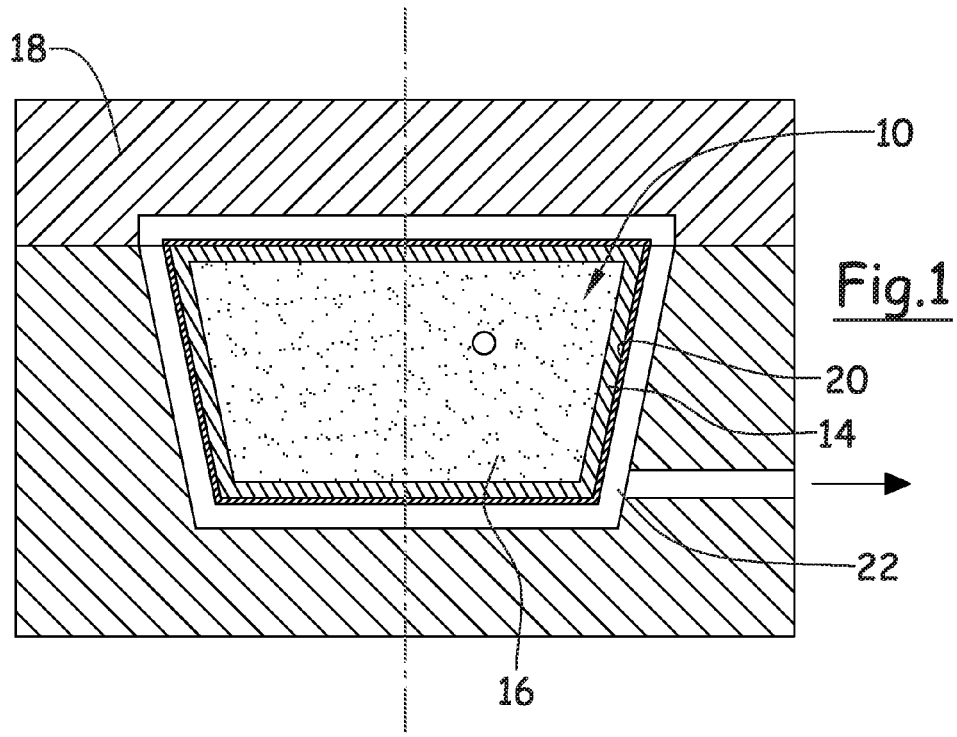

| | | | |
|---|---|---|---|
| 4,193,750 A * | 3/1980 | Nielson | 425/60 |
| 4,315,875 A * | 2/1982 | Hoedt | 264/430 |
| 4,331,857 A * | 5/1982 | Crisci et al. | 219/137 WM |
| 4,549,584 A * | 10/1985 | Morin et al. | 141/73 |
| 5,352,259 A * | 10/1994 | Oku et al. | 65/412 |
| 6,524,421 B1 * | 2/2003 | Chen et al. | 156/245 |
| 6,589,470 B2 * | 7/2003 | Fried et al. | 264/443 |
| 7,559,332 B2 * | 7/2009 | Teufel et al. | 134/22.12 |
| 7,678,306 B2 * | 3/2010 | Longo | 264/71 |
| 7,815,834 B2 * | 10/2010 | Younie et al. | 264/219 |

FOREIGN PATENT DOCUMENTS

| | | |
|---|---|---|
| JP | 61202827 A | 9/1986 |
| WO | 2008003768 A1 | 1/2008 |

* cited by examiner

METHOD OF MAKING A CORE COMPRISING AN ENVELOPE CONTAINING GRANULAR AND/OR POWDERY PRODUCTS, DEVICE AND CORE OBTAINED

This invention relates to a process for the production of a core that comprises an envelope that contains granular and/or powdered products as well as a core that is obtained from said process.

The production of certain parts comprising an open cavity requires the use of a core.

According to a first variant that is described in the document FR-2,576,546, the core is made of a water-soluble material, for example from a sand agglomerate and a binder that consists of a polymerized formophenolic resin with a hardener such as a diisocyanate, in the presence of a catalyst such as an amine that is preferably liquid.

The mixture of sand and binder is poured into a mold to be subsequently baked.

This type of core is used in particular for the production of parts that are made of composite material comprising an open cavity, whereby the core is inserted between two parts until polymerization takes place. After the polymerization of the part around the core, the latter is broken up by means of an organic solvent.

This operating mode is not satisfactory because the homogeneity of the core and its dimensional characteristics are closely linked to the dexterity of the operator responsible for the manual filling of the mold.

Consequently, the non-reproducibility of the primary characteristics of the core means not controlling the dimensional characteristics of the part to be produced using the core.

Also, the purpose of this invention is to remedy the drawbacks of the prior art by proposing a process for reproducible production of a core that makes it possible to control the dimensional characteristics of the part that is produced by using the core.

For this purpose, the invention has as its object a process for the production of a core that can be used for the production of a part that is made of composite material, whereby said core consists of at least one powdered and/or granular product, consisting in introducing said at least one powdered and/or granular product by vibrating it in an outer envelope placed in a device that comprises a cavity that is delimited by a wall whose geometry is adapted to that of the core to be made and flattening said outer envelope against said wall, characterized in that vibrations are emitted slightly above the fill level during filling.

Figure 2:
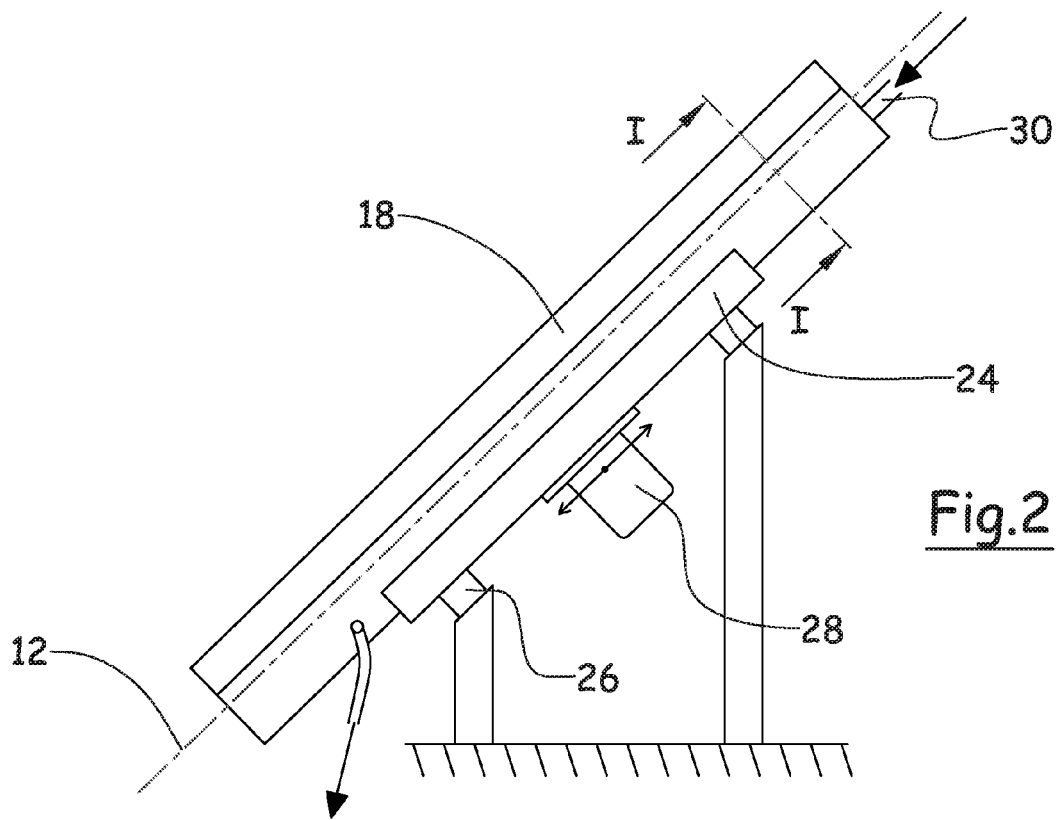

Other characteristics and advantages will emerge from the following description of the invention, a description that is provided only by way of example, relative to the accompanying drawings in which:

FIG. 1 is a cutaway view along the line I-I of FIG. 2 of a mold that makes it possible to produce a core according to the invention, and FIG. 2 is a side view of a device for the implementation of the process according to the invention.

FIG. 1 shows a core at 10. By way of example, the core has a constant cross-section, for example trapezoidal, and extends in a longitudinal direction that is formed by the axis 12. However, the invention is not limited to this geometry.

According to one application, this core 10 can be used to manufacture a part that is made of composite material and can be inserted between a panel and an omega-shaped stiffener so as to guarantee the geometry of the stiffener after polymerization.

As for the geometry of the core, the invention is not limited to this application.

According to the invention, the core 10 comprises an outer envelope 14 that contains a fill material 16 that forms the heart of the core.

Preferably, the outer envelope 14 is made of a flexible and airtight material, for example silicone.

The fill material 16 consists of at least one powdered and/or granular product. By way of example, microballs constitute the fill material 16. However, other materials can be considered.

According to the invention, the core 10 is made from a device 18 that comprises a cavity that is delimited by a wall 20 whose geometry is adapted to that of the core that is to be produced. According to the variants, the mold 18 can comprise one or more parts, two parts according to the example that is illustrated in FIG. 1.

The process of the invention is characterized in that it consists in flattening the outer envelope 14 against the wall 20 of the cavity of the device and then in inserting the fill material 16 in said envelope by vibrating it.

The fact of flattening the outer envelope 14 makes it possible to control the outer shapes of the core (cross-section and length) and to produce the cores in a reproducible manner.

The fact of vibrating the fill material 16 during filling makes it possible to obtain a homogeneous core and to obtain an optimized filling in a reproducible manner.

According to one embodiment, the outer envelope 14 is flattened against the wall 20 using a peripheral vacuum network 22 that generates a pressure differential on either side of the envelope. For this purpose, the wall 20 is porous, microperforated or perforated.

The shapes and sizes of the peripheral vacuum network 22 are adjusted by one skilled in the art in such a way as to obtain a satisfactory flattening of the outer envelope 14 against the wall 20 of the mold.

The device 18 is inclined in such a way as to obtain a gradual filling by gravity. For this purpose, the device 18 is positioned on a support 24 whose slope is adjustable, in particular the angle that is formed by the longitudinal direction 12 and the horizontal direction.

Preferably, the support 24 and the device 18 are mounted on means 26 for limiting the propagation of vibrations, for example silent blocks.

The support 24 is not presented in more detail because it is within the scope of one skilled in the art. At least one source of vibrations 28 is connected to the support 24 or to the device 18. According to the invention, the vibrations are emitted slightly above the fill level during filling. This characteristic makes it possible to optimize the filling.

According to a first variant, a source of vibrations 28 is connected to the support 24 and can slide along said support 24 in the longitudinal direction 12 by following the fill level. Preferably, the source of vibrations 28 moves translationally so as to always remain slightly above the fill level. This configuration makes it possible to obtain an optimized organization of the fill material and a homogeneous filling.

According to another variant, several sources of vibrations 28 are connected to the support 24 and distributed in a uniform manner in the longitudinal direction 12. In this case, the sources of vibrations 28 operate by sector, with the sources of vibrations 28 located below the fill level no longer emitting vibrations as the fill level rises. Advantageously, only the source(s) of vibrations 28 located just above the fill level emit(s) vibrations, the others being started or stopped with the filling.

This principle of operation of the sources of vibrations makes it possible to obtain an optimized organization of the fill material 16 and a homogeneous filling.

The fill material 16 is inserted in the outer envelope 14 by gravity via one end 30 of the device, optionally by using a funnel.

According to another characteristic of the invention, the source(s) of vibrations emit(s) vibrations at frequencies of between 20 and 150 Hz. Preferably, the frequencies are greater than 50 Hz so as to reduce the impact of vibrations on the device. By way of example, the vibrations have a frequency on the order of 70 Hz for a fill material in the form of balls with a 1 mm diameter with a device that is inclined at 25° and that is 1.7 m in length. The characteristics of the vibrations (amplitude and frequency) are adjusted based on the device, in particular its length, its slope, and the fill material so as to obtain the best filling rate.

This filling rate is also based on the slope of the device, with the filling rate being better the more inclined the device. However, the longer and more inclined the device, the more the fill level varies from one end to the other of the core because of the pressure due to the column of the fill material and the compression in the lower portion of the outer envelope 14. Advantageously, the device is inclined on the order of 45° to obtain a good compromise.

The invention claimed is:

1. A process for producing a homogenous mold core that can be used for manufacturing a composite part, said mold core comprising at least one powdered and/or granular material, the process comprising the steps of:
   providing a mold positioned on a support whose slope is adjustable to allow gradual filling of the mold by gravity, said mold delimited by a cavity wall whose geometry is adapted to that of the core to be produced, and said support mounting a vibration source adjacent to said mold;
   flattening the periphery of a hollow outer mold core envelope against said cavity wall;
   filling at least one powdered and/or granular material into the area delimited by said flattened periphery, said filling occurring gradually, by gravity, and in a longitudinal direction extending along said slope; and
   emitting vibrations from said vibration source into said material within said flattened periphery and within said mold simultaneously during filling,
   wherein said vibrations are emitted slightly above a gradually rising fill level of said material for the entirety of said filling by gradually moving said vibration source along both of said support and said longitudinal direction to position said vibration source slightly above said fill level simultaneously during filling, and
   wherein the slope of said support is adjusted prior to said filling to form a non-zero angle formed between a horizontal direction and said longitudinal direction.

2. The process according to claim 1, wherein said slope is at 45°.

3. The process according to claim 1, wherein said vibrations are at a frequency of between 20 and 150 Hz.

4. The process according to claim 1, wherein said mold comprises a peripheral vacuum network, and wherein said flattening is conducted by generating a pressure differential via said network on either side of said envelope, said mold wall being porous, microperforated, or perforated for generating said pressure differential.

5. The process according to claim 1, wherein said powdered and/or granular material are microballs.

6. The process according to claim 1, wherein said mold and support are mounted on means for limiting the propagation of said vibrations.

7. The process according to claim 6, wherein said means for limiting the propagation of said vibrations are silent blocks.

8. The process according to claim 1, wherein said envelope is made of a flexible and airtight material.

9. The process according to claim 8, wherein said flexible and airtight material is silicone.

10. A process for producing a homogenous mold core that can be used for manufacturing a composite part, said mold core comprising at least one powdered and/or granular material, the process comprising the steps of:
    providing a mold positioned on a support whose slope is adjustable to incline the mold, said mold delimited by a cavity wall whose geometry is adapted to that of the core to be produced, and said support mounting a vibration source adjacent to said mold;
    flattening the periphery of a hollow outer mold core envelope against said cavity wall;
    filling at least one powdered and/or granular material into the area delimited by said flattened periphery, said filling occurring gradually, by gravity, and in a longitudinal direction extending along said slope; and
    emitting vibrations from said vibration source into said material within said flattened periphery and within said mold simultaneously during filling, wherein said vibrations are emitted slightly above a gradually rising fill level of said material for the entirety of said filling by gradually moving said vibration source along both of said support and said longitudinal direction to position said vibration source slightly above said fill level simultaneously during filling, and
    wherein the slope of said support is adjusted prior to said filling to form a non-zero angle formed between a horizontal direction and said longitudinal direction.

11. The process according to claim 10, wherein said slope is at 45°.

12. The process according to claim 10, wherein said vibrations are at a frequency of between 20 and 150 Hz.

13. The process according to claim 10, wherein said mold comprises a peripheral vacuum network, and wherein said flattening is conducted by generating a pressure differential via said network on either side of said envelope, said mold wall being porous, microperforated, or perforated for generating said pressure differential.

14. The process according to claim 10, wherein said powdered and/or granular material are microballs.

15. The process according to claim 10, wherein said mold and support are mounted on means for limiting the propagation of said vibrations.

16. The process according to claim 15, wherein said means for limiting the propagation of said vibrations are silent blocks.

17. The process according to claim 10, wherein said envelope is made of a flexible and airtight material.

18. The process according to claim 17, wherein said flexible and airtight material is silicone.

* * * * *

UNITED STATES PATENT AND TRADEMARK OFFICE
CERTIFICATE OF CORRECTION

PATENT NO.       : 8,460,596 B2
APPLICATION NO.  : 13/000210
DATED            : June 11, 2013
INVENTOR(S)      : Le Hetet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 7 days.

Signed and Sealed this
Eighth Day of September, 2015

Michelle K. Lee
*Director of the United States Patent and Trademark Office*